United States Patent
Philpott

(10) Patent No.: US 11,773,928 B2
(45) Date of Patent: Oct. 3, 2023

(54) BRAKE ASSEMBLY HAVING A GUIDE PIN ASSEMBLY

(71) Applicant: ArvinMeritor Technology, LLC, Troy, MI (US)

(72) Inventor: Daniel Philpott, Goodrich, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 141 days.

(21) Appl. No.: 17/120,655

(22) Filed: Dec. 14, 2020

(65) Prior Publication Data

US 2022/0186797 A1 Jun. 16, 2022

(51) Int. Cl.
| | |
|---|---|
| *F16D 55/2265* | (2006.01) |
| *F16D 65/00* | (2006.01) |
| *F16D 65/097* | (2006.01) |
| *F16D 55/00* | (2006.01) |

(52) U.S. Cl.
CPC ..... *F16D 55/2265* (2013.01); *F16D 65/0068* (2013.01); *F16D 65/0087* (2013.01); *F16D 65/0971* (2013.01); *F16D 2055/0016* (2013.01)

(58) Field of Classification Search
CPC ............. F16D 55/22655; F16D 55/227; F16D 55/2265; F16D 55/2262; F16D 2055/0016; F16D 65/0971; F16D 65/0087
See application file for complete search history.

(56) References Cited

U.S. PATENT DOCUMENTS

| | | | | | |
|---|---|---|---|---|---|
| 4,375,842 | A | * | 3/1983 | Melinat | F16D 55/227 188/72.3 |
| 4,436,186 | A | * | 3/1984 | Ritsema | F16D 65/54 188/196 P |
| 4,458,790 | A | * | 7/1984 | Hoffman, Jr. | F16D 55/22655 188/196 P |
| 4,781,273 | A | * | 11/1988 | Fujinami | B61H 5/00 188/73.45 |
| 4,887,696 | A | * | 12/1989 | Redenbarger | F16D 55/227 188/73.34 |
| 5,087,907 | A | * | 2/1992 | Weiler | F16D 66/026 200/61.4 |
| 5,467,848 | A | * | 11/1995 | Knez | F16D 55/22655 188/73.31 |
| 5,526,904 | A | * | 6/1996 | Walden | F16D 55/22655 188/73.44 |

(Continued)

FOREIGN PATENT DOCUMENTS

| | | |
|---|---|---|
| DE | 102015114437 A1 | 3/2017 |
| EP | 3051165 A1 | 8/2016 |

OTHER PUBLICATIONS

Extended European Search Report dated May 11, 2022 for related European Application No. 21213297.1; 7 Pages.

(Continued)

*Primary Examiner* — Robert A. Siconolfi
*Assistant Examiner* — Mahbubur Rashid
(74) *Attorney, Agent, or Firm* — Brooks Kushman PC

(57) ABSTRACT

A brake assembly having a guide pin assembly that slidably couples a brake caliper to a brake carrier. The guide pin assembly may include a resilient member that extends between a bushing and a sleeve. The sleeve may be mounted to the brake carrier. The brake caliper may be slidable along the bushing.

20 Claims, 6 Drawing Sheets

(56) References Cited

U.S. PATENT DOCUMENTS

| | | | | |
|---|---|---|---|---|
| 5,647,459 | A * | 7/1997 | Buckley | F16D 55/22655 403/32 |
| 7,721,854 | B1 * | 5/2010 | Mackiewicz | F16D 55/22655 188/73.44 |
| 8,220,596 | B2 * | 7/2012 | Fischer | F16D 55/22655 188/73.44 |
| 8,944,221 | B2 * | 2/2015 | Pericevic | F16D 65/54 188/73.44 |
| 9,308,924 | B2 * | 4/2016 | Suzuki | F16D 65/54 |
| 9,587,686 | B2 * | 3/2017 | Morais | F16D 55/227 |
| 9,651,106 | B2 * | 5/2017 | Suzuki | F16D 65/54 |
| 9,816,577 | B2 * | 11/2017 | Fischer | F16D 55/22655 |
| 9,845,837 | B2 | 12/2017 | Thomas | |
| 10,221,904 | B2 | 3/2019 | Knoop | |
| 10,280,992 | B2 * | 5/2019 | Fischer | F16D 55/227 |
| 10,458,494 | B2 * | 10/2019 | Gerber | F16D 55/22655 |
| 10,801,566 | B2 * | 10/2020 | Taylor | F16D 55/22655 |
| 2008/0029356 | A1 * | 2/2008 | Halasy-Wimmer | F16D 55/22655 188/73.45 |
| 2009/0200122 | A1 * | 8/2009 | Bagge | F16D 65/0012 384/192 |
| 2013/0199879 | A1 | 8/2013 | Thompson et al. | |
| 2014/0003747 | A1 * | 1/2014 | Schneider | F04D 29/628 384/100 |
| 2014/0116817 | A1 * | 5/2014 | Morais | F16D 55/227 188/73.44 |
| 2015/0053510 | A1 * | 2/2015 | Suzuki | F16D 55/2245 188/71.6 |
| 2016/0356326 | A1 | 12/2016 | Knoop | |
| 2017/0350460 | A1 * | 12/2017 | Meise | F16D 55/226 |
| 2018/0080510 | A1 | 3/2018 | Thomas | |
| 2018/0087589 | A1 * | 3/2018 | Gerber | F16D 55/2265 |
| 2018/0119760 | A1 * | 5/2018 | Gerber | F16D 65/0006 |
| 2019/0162256 | A1 | 5/2019 | Taylor et al. | |
| 2019/0195299 | A1 | 6/2019 | Knoop | |
| 2020/0256410 | A1 * | 8/2020 | Willey | F16D 65/0056 |

OTHER PUBLICATIONS

U.S. Appl. No. 16/788,556, filed Feb. 12, 2020 32 pages.
U.S. Appl. No. 16/986,352, filed Aug. 6, 2020 34 pages.
U.S. Appl. No. 16/986,371, filed Aug. 6, 2020 33 pages.
U.S. Appl. No. 16/986,377, filed Aug. 6, 2020 40 pages.
U.S. Appl. No. 16/986,385, filed Aug. 6, 2020 37 pages.
U.S. Appl. No. 16/999,610, filed Aug. 21, 2020 32 pages.
European Examination Report dated Jul. 26, 2023 for related European Appln. No. 21213297.1; 5 Pages.

* cited by examiner

BRAKE ASSEMBLY HAVING A GUIDE PIN ASSEMBLY

TECHNICAL FIELD

This disclosure relates to a brake assembly having a guide pin assembly. The guide pin assembly may include a bushing that is supported by a resilient member.

BACKGROUND

A guide assembly for a disc brake is disclosed in U.S. Pat. No. 9,845,837.

SUMMARY

In at least one embodiment, a brake assembly is provided. The brake assembly may include a brake carrier, a brake caliper, and a guide pin assembly. The brake caliper may define a bore that may extend along an axis. The guide pin assembly may slidably couple the brake caliper to the brake carrier. The guide pin assembly may include a bushing, a sleeve, a resilient member, and a fastener. The bushing may be received in the bore. The sleeve may be received in the bushing. The resilient member may be received in the bushing and may extend between the bushing and the sleeve. The fastener may fixedly couple the sleeve to the brake carrier. The brake caliper may be slidable along the bushing.

In at least one embodiment, a brake assembly is provided. The brake assembly may include a brake carrier, a brake caliper, and a guide pin assembly. The brake caliper may have a caliper housing that may define a bore that extends along an axis. The brake carrier may receive an inboard brake pad assembly and an outboard brake pad assembly. The inboard brake pad assembly may be positioned between the caliper housing and a brake rotor. The outboard brake pad assembly may be positioned on an opposite side of the brake rotor from the inboard brake pad assembly. The guide pin assembly may slidably couple the brake caliper to the brake carrier. The guide pin assembly may include first and second bushings, a sleeve, first and second resilient members, and a fastener. The first and second bushings may be received in the bore and may engage the brake caliper. The sleeve may be received in the first and second bushings. The first and second resilient members may engage the sleeve and may engage and may be received in the first and second bushings, respectively. The fastener may be received in the sleeve and may fixedly couple the sleeve to the brake carrier. Potential energy may be stored in the first and second resilient members when the brake caliper slides along the first and second bushings in a first direction. Potential energy may be released from the first and second resilient members to urge the brake caliper to slide along the first and second bushings in a second direction that is disposed opposite the first direction.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
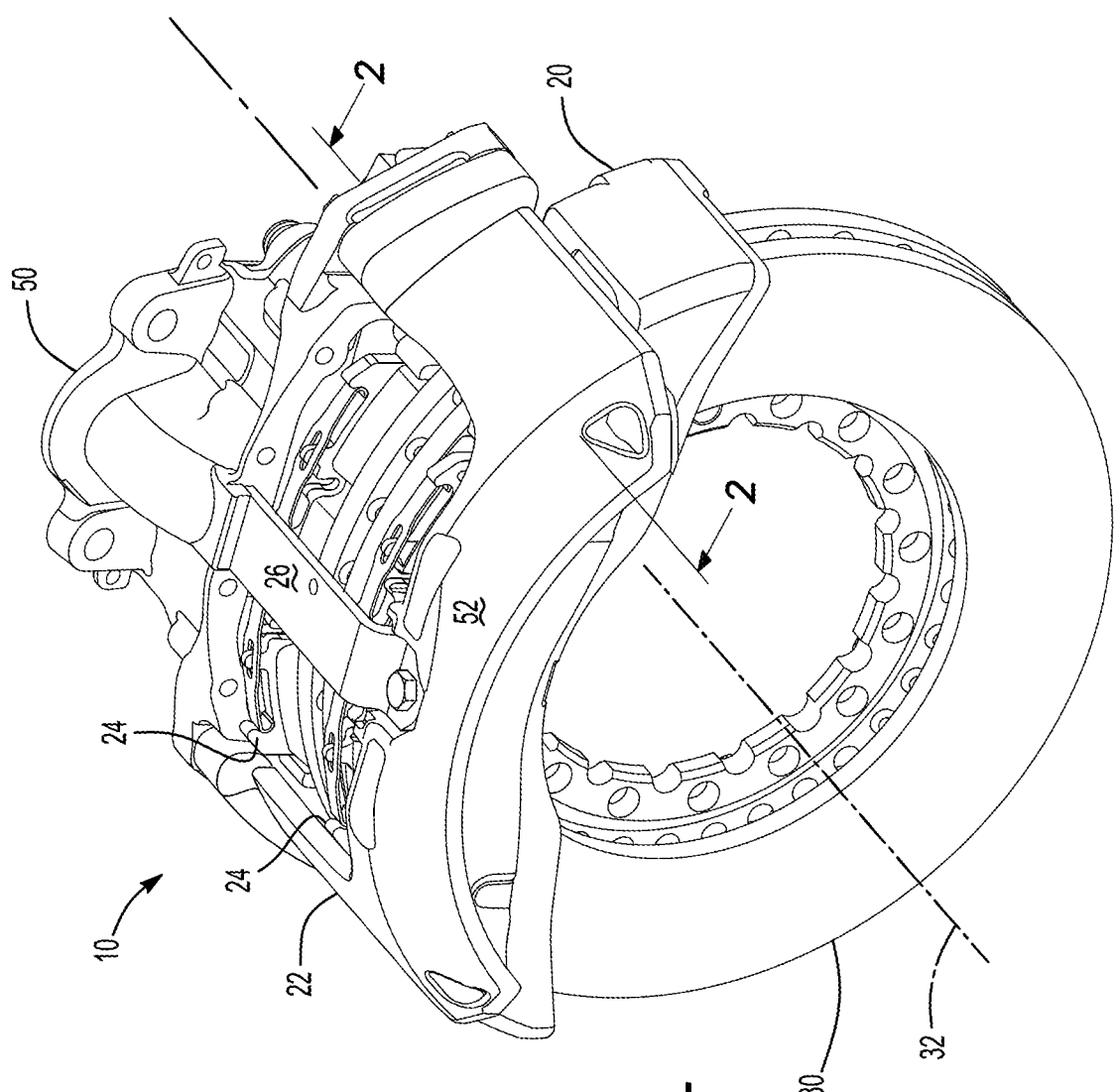
FIG. 1 is a perspective view of an example of a brake assembly and a brake rotor.
Figure 2:
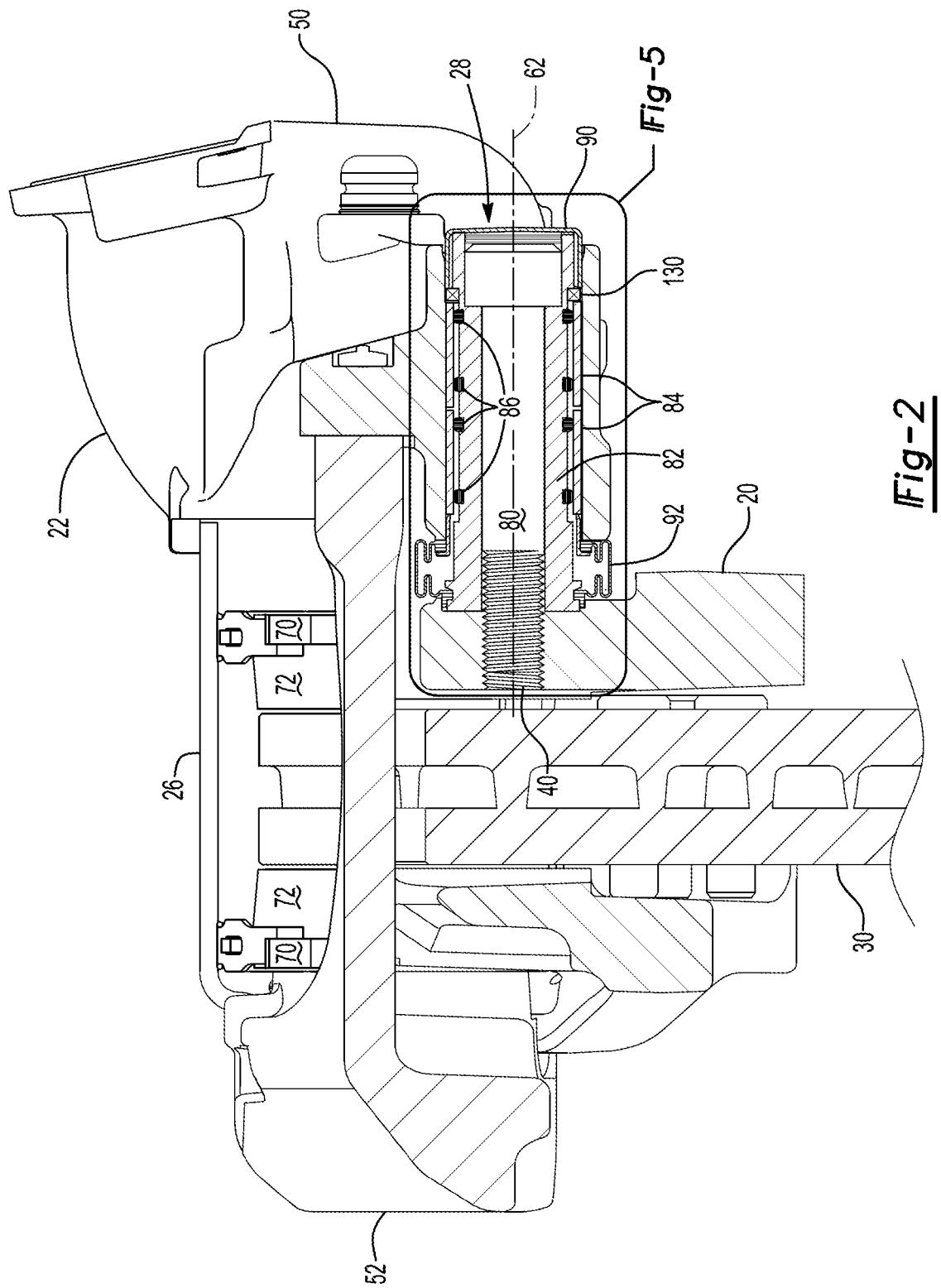
FIG. 2 is a section view along section line 2-2 showing the brake assembly in a first position in which braking is not applied.

Referring to FIG. 1, an example of a brake assembly 10 is shown. The brake assembly 10 may be provided as part of a vehicle, such as a motor vehicle like a truck, bus, farm equipment, military transport or weaponry vehicle, or cargo loading equipment for land, air, or marine vessels. The brake assembly 10 may be configured as a disc brake. In at least one configuration, the brake assembly 10 may include a brake carrier 20, a brake caliper 22, a pair of brake pad assemblies 24, and optionally a retainer bracket 26. Referring primarily to FIG. 2, the brake assembly 10 may also include at least one guide pin assembly 28.

Referring to FIGS. 1 and 2, the brake carrier 20 may be fixedly mountable to the vehicle. For example, the brake carrier 20 may be directly or indirectly mounted to an axle assembly or a steering knuckle. The brake carrier 20 may receive and support the brake pad assemblies 24 in a manner that permits the brake pad assemblies 24 to move toward and away from a brake rotor 30 while inhibiting rotation of the brake pad assemblies 24. The brake carrier 20 may include a rotor opening that may receive a brake rotor 30 that may be rotatable about a brake rotor axis 32. As such, the brake carrier 20 may straddle the brake rotor 30 and help position the brake pad assemblies 24 on opposite sides of the brake rotor 30. In addition, the brake carrier 20 may include one or more fastener holes 40 that may facilitate mounting of a corresponding guide pin assembly 28.

Referring to FIG. 2, a fastener hole 40 may have any suitable configuration. For instance, a fastener hole 40 may be threaded and may be configured as a through hole.

Referring to FIGS. 1 and 2, the brake caliper 22 may receive various components of the brake assembly 10. In addition, the brake caliper 22 may facilitate positioning of the brake pad assemblies 24 with respect to the brake rotor 30 to facilitate braking of the vehicle. In at least one configuration, the brake caliper 22 may include a caliper housing 50 and a caliper bridge 52.

Figure 4:
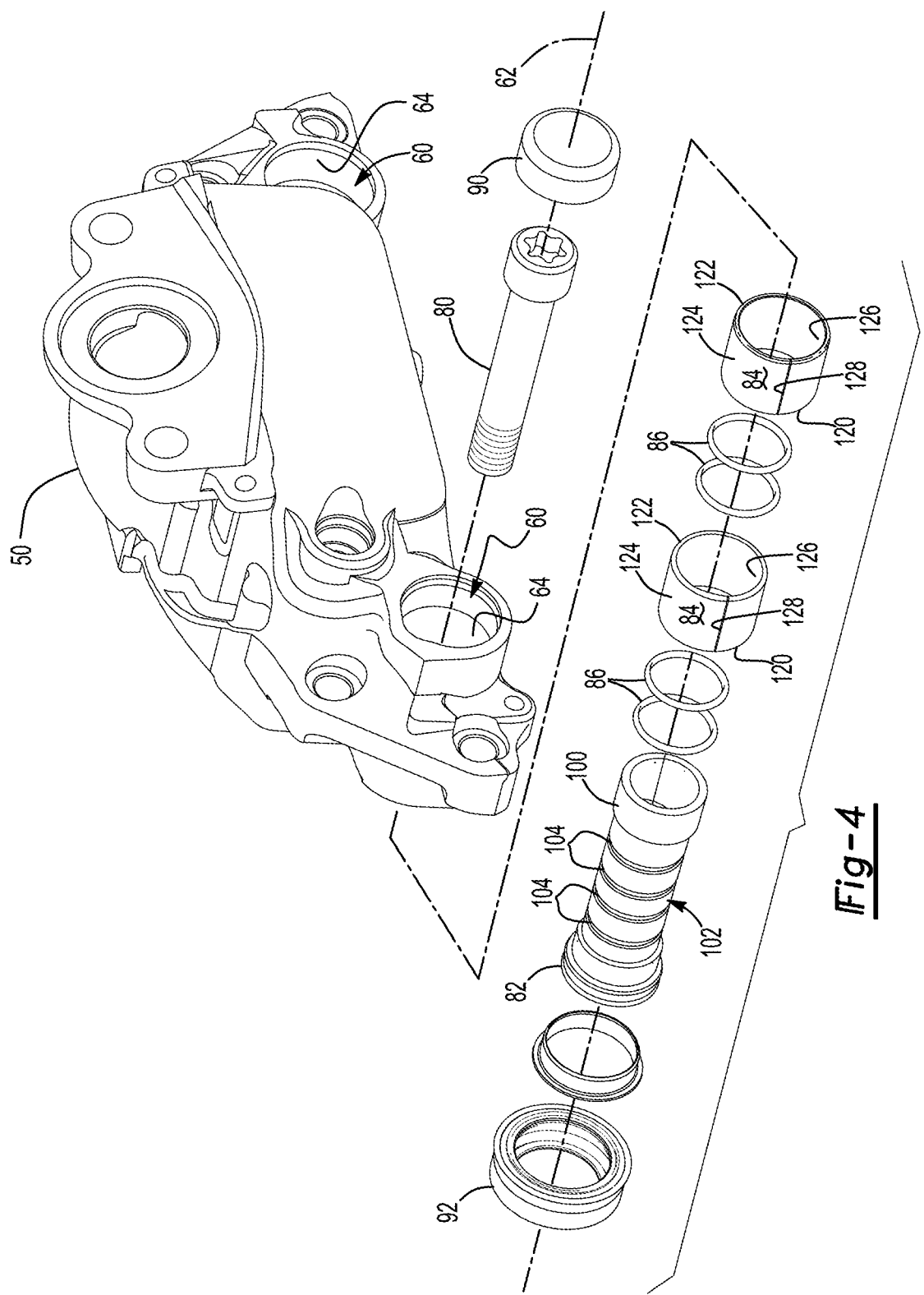
FIG. 4 is an exploded view of a portion of the brake assembly that includes a guide pin assembly.

Referring to FIGS. 1, 2 and 4, the caliper housing 50 may be moveably disposed on the brake carrier 20. For example, the caliper housing 50 may be slidably disposed on a pair of guide pin assemblies 28 that may be fixedly disposed on the brake carrier 20. The caliper housing 50 may facilitate mounting of the brake actuator and may define a cavity that may receive or partially receive various components that facilitate movement of the brake pad assemblies 24, such as an operating shaft, yoke, tappet, piston, and wear adjuster mechanism. Examples of such components are described in U.S. patent application Ser. No. 17/014,548, which is hereby incorporated by reference in its entirety. It is further noted that the present invention is not limited to configurations as described in U.S. patent application Ser. No. 17/014,548. In at least one configuration, the caliper housing 50 may define one or more bores 60.

Figure 5:
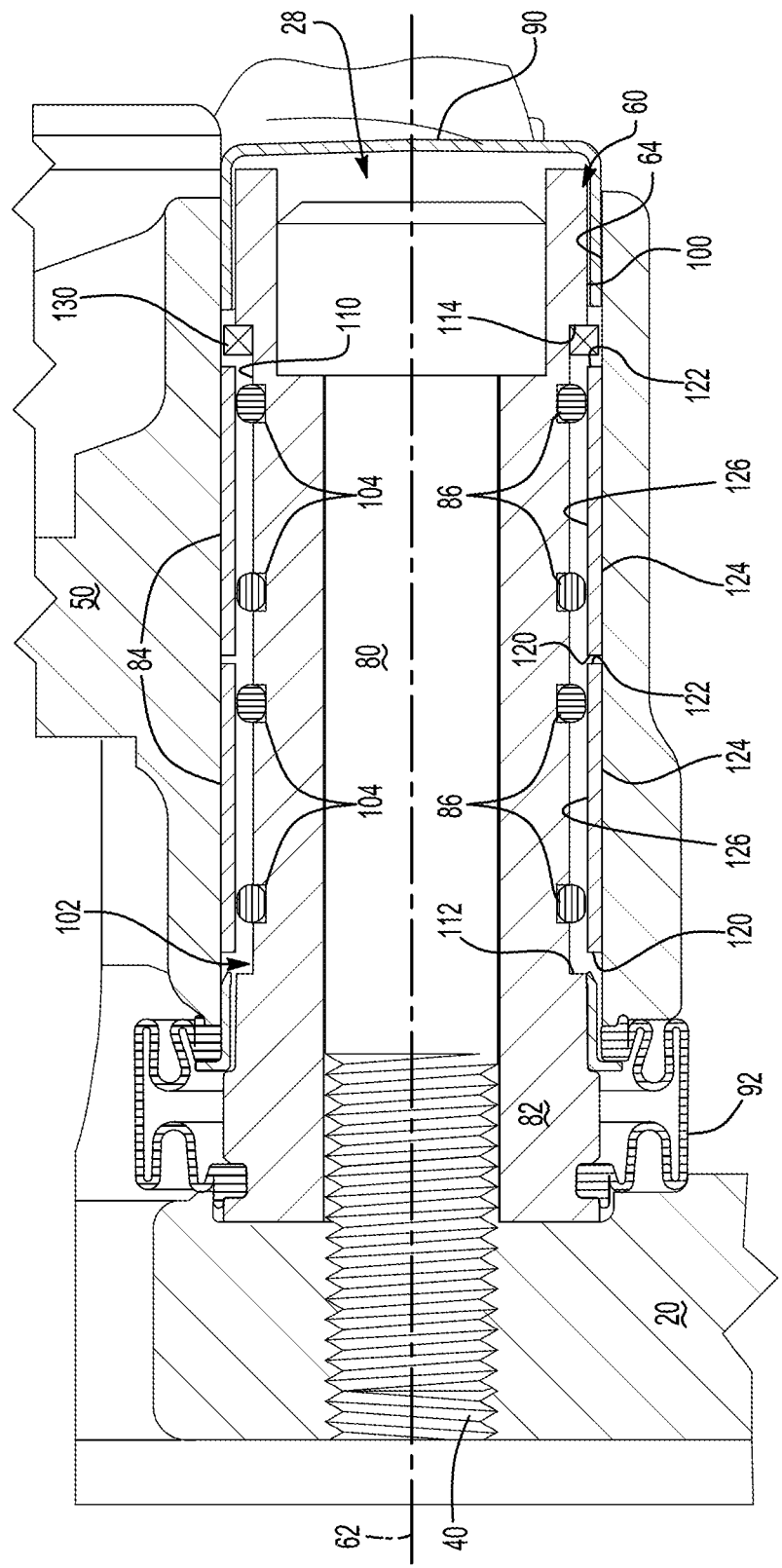
FIG. 5 is a magnified view of a portion of FIG. 2 showing the guide pin assembly.

Referring to FIGS. 4 and 5, a bore 60 may be configured to receive a corresponding guide pin assembly 28. A pair of bores 60 may be provided that may be disposed proximate opposite lateral sides of the brake caliper 22. In at least one configuration, each bore 60 may extend along an axis 62 and may be configured as a through hole. The axis 62 may extend parallel or substantially parallel to the brake rotor axis 32. A bore 60 may have a cylindrical configuration in which the bore 60 may be defined by a bore surface 64. The bore surface 64 may extend around the axis 62. The bore surface 64 may be radially disposed with respect to the axis 62.

A cap 90 may be provided to cover the end of the bore 60 that faces away from the brake carrier 20. In at least one configuration, the cap 90 may be received in the bore 60 and may partially receive the guide pin assembly 28.

A flexible boot 92 may extend between the brake carrier 20 and the brake caliper 22 or between the guide pin assembly 28 and the brake caliper 22. The flexible boot 92 may flex response to movement of the brake caliper 22. For instance, the flexible boot 92 may expand or unfold when the brake caliper 22 moves in a first direction with respect to the brake carrier 20 and may contract or fold when the brake caliper 22 moves in a second direction with respect to the brake carrier 20.

Referring to FIGS. 1 and 2, the caliper bridge 52 may extend from the caliper housing 50. The caliper bridge 52 may be integrally formed with the caliper housing 50 or may be fixedly disposed on the caliper housing 50. For example, the caliper bridge 52 may be provided as a separate component that may be coupled to the caliper housing 50 with one or more fasteners, such as bolts. In at least one configuration, the caliper bridge 52 may cooperate with the caliper housing 50 to at least partially define an opening that may facilitate insertion and removal of the brake pad assemblies 24.

A pair of brake pad assemblies 24 may be received in and may be supported by the brake carrier 20. The brake pad assemblies 24 may be disposed on opposite sides of the brake rotor 30 and may be engageable with the brake rotor 30 to slow rotation of the brake rotor 30 and an associated wheel about the brake rotor axis 32. One brake pad assembly 24 may be positioned between the caliper housing 50 and the brake rotor 30 and may be referred to as an inboard brake pad assembly 24. The inboard brake pad assembly 24 is located to the right of the brake rotor 30 from the perspective shown in FIG. 2. The other brake pad assembly 24 may be positioned on the opposite side of the brake rotor 30 between the caliper bridge 52 and the brake rotor 30 and may be referred to as an outboard brake pad assembly 24. The outboard brake pad assembly 24 is located to the left of the brake rotor 30 from the perspective shown in FIG. 2. Each brake pad assembly 24 may include a backplate 70 and friction material 72.

The backplate 70 may be a structural member of a brake pad assembly 24. The backplate 70 may be configured as a generally flat plate and may be made of any suitable material, such as metal or a metal alloy. In at least one configuration, a side of the backplate 70 of the inboard brake pad assembly 24 that faces away from the friction material 72 may engage or contact a tappet that may be extendable from the cavity of the caliper housing 50 to actuate the inboard brake pad assembly 24 into engagement with the brake rotor 30. A side of the backplate 70 of the outboard brake pad assembly 24 that faces away from its friction material 72 may engage or contact the caliper bridge 52.

The friction material 72 may be disposed on a side of the backplate 70 that may face toward the brake rotor 30. The friction material 72 may contact the brake rotor 30 during vehicle braking.

Referring to FIGS. 1 and 2, the retainer bracket 26 may be removably mounted to the brake caliper 22. For example, the retainer bracket 26 may extend across the brake pad assemblies 24 and the opening in the brake caliper 22 to help retain the brake pad assemblies 24 in the brake carrier 20 when the retainer bracket 26 is secured to the brake caliper 22. The retainer bracket 26 may be detached from or removed from the brake caliper 22 to permit removal of the brake pad assemblies 24 or installation of the brake pad assemblies 24 via the opening.

Referring to FIGS. 2 and 5, the guide pin assembly 28 may slidably couple the brake caliper 22 to the brake carrier 20 such that the brake caliper 22 may slide along the guide pin assembly 28. In at least one configuration, the guide pin assembly 28 may include a fastener 80, a sleeve 82, at least one bushing 84, and at least one resilient member 86.

Referring primarily to FIGS. 4 and 5, the fastener 80 may fixedly couple the sleeve 82 to the brake carrier 20. The fastener 80 may have any suitable configuration. For instance, the fastener 80 may be configured as a bolt, such as a carriage bolt, that may be received in the fastener hole 40 of the brake carrier 20. The fastener 80 may be partially received in the bore 60 of the caliper housing 50 and may extend along or around the axis 62. It is noted that in FIGS. 2, 3, 5 and 6 that the fastener 80 has not been sectioned for clarity but is in the section plane.

The sleeve 82 may receive the fastener 80. For instance, the sleeve 82 may be configured as a hollow tube that may receive the fastener 80 and that may be at least partially received in the bore 60 of the caliper housing 50. The hollow portion of the sleeve 82 that may receive the fastener 80 may be sized slightly larger than the fastener 80 so as to permit insertion and rotation of the fastener 80 for assembly purposes but may otherwise generally center the sleeve 82 about the axis 62. The sleeve 82 may be fixedly positioned or stationary with respect to the brake carrier 20. The sleeve 82 may extend from and may engage or contact the brake carrier 20. Alternatively, the sleeve 82 may be separated from the brake carrier 20 by an intervening component.

In at least one configuration, the sleeve 82 may have an exterior surface 100 that may face away from the axis 62. The sleeve 82 may also include a recess 102, one or more grooves 104, or both.

The exterior surface 100 may be at least partially received in the bore 60 of the caliper housing 50. The exterior surface 100 may be an outside circumferential surface of the sleeve 82 and may be spaced apart from the bore surface 64. The exterior surface 100 may extend from the recess 102.

The recess 102, if provided, may extend toward the axis 62 from the exterior surface 100. As such, the recess 102 to may have a smaller diameter than the exterior surface 100. The recess 102 may or may not receive a bushing 84 as will be discussed in more detail below. In at least one configuration and as is best shown with reference to FIG. 5, the recess 102 may be defined by a recess bottom surface 110, a first recess end surface 112, and/or a second recess end surface 114.

The recess bottom surface 110 may be disposed at the bottom of the recess 102. The recess bottom surface 110 may be disposed closer to the axis 62 than the exterior surface 100. In at least one configuration, the recess bottom surface 110 may extend substantially parallel to the axis 62, the bore surface 64, the exterior surface 100, or combinations thereof.

The first recess end surface 112 may extend away from the axis 62 from an end of the recess bottom surface 110. For instance, the first recess end surface 112 may extend from a first end of the recess bottom surface 110 to the exterior surface 100.

The second recess end surface 114 may extend away from the axis 62 from a second end of the recess bottom surface 110 that may be disposed opposite the first end. As such, the second recess end surface 114 may be disposed opposite the first recess end surface 112. It is also contemplated that the first recess end surface 112 or the second recess end surface 114 may be omitted, in which case the recess 102 may extend to an end of the sleeve 82 and may not extend to the exterior surface 100.

One or more grooves 104 may be provided with the sleeve 82. A groove 104 may partially receive at least one resilient member 86. If provided, a groove 104 may be provided in addition to a recess 102 or in lieu of a recess 102. In the configuration shown, four grooves 104 are illustrated that are provided in the recess 102; however, it is contemplated that a greater or lesser number of grooves 104 may be provided. A groove 104 may extend from the exterior surface 100 toward the axis 62 if the recess 102 is not provided. A groove 104 may extend from the recess bottom surface 110 toward the axis 62 if the recess 102 is provided. In such a configuration, the groove 104 may have a smaller diameter than the recess bottom surface 110. The grooves 104 may be spaced apart from each other when multiple grooves 104 are provided.

Figure 6:
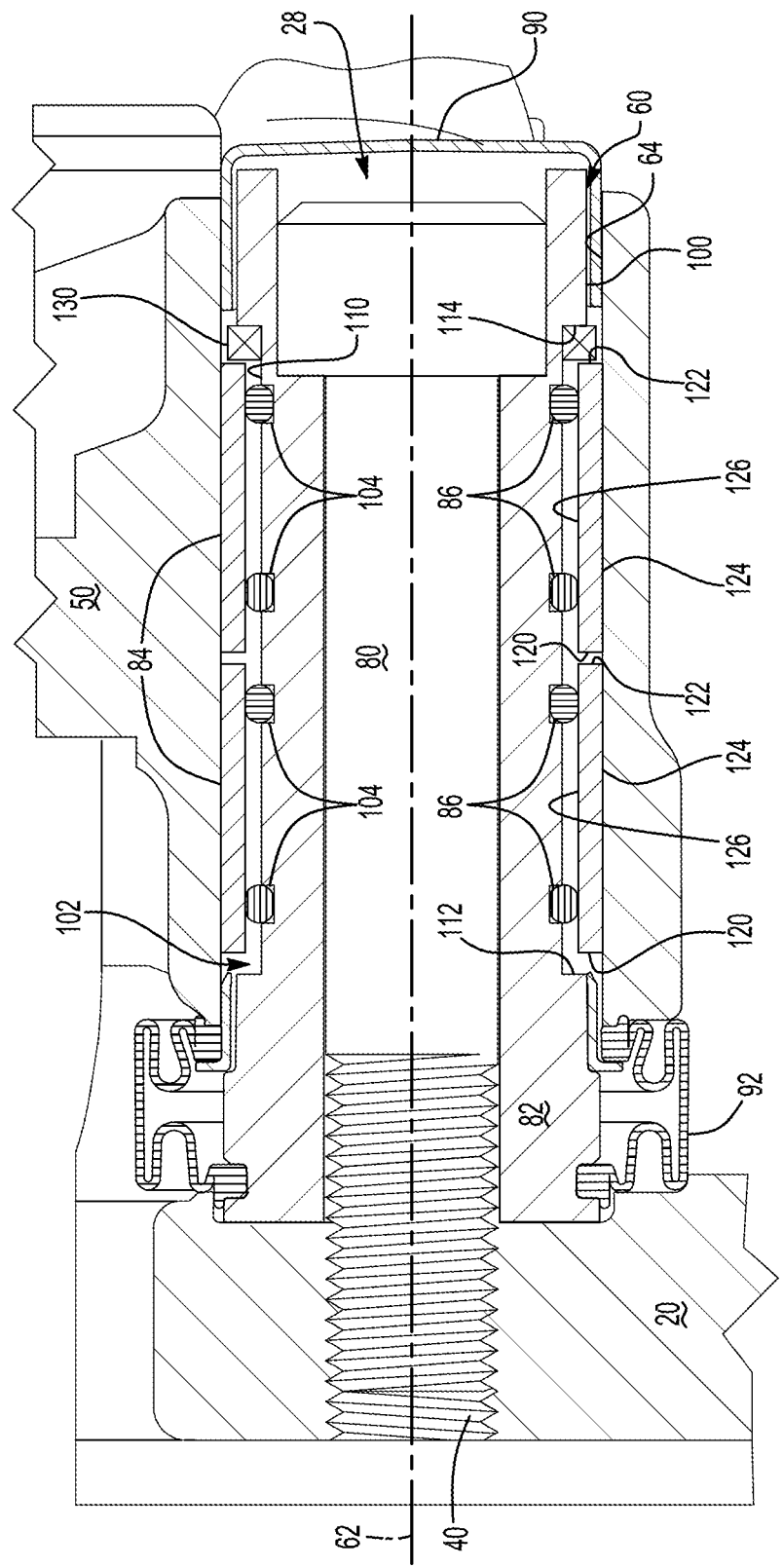
FIG. 6 is a magnified view showing another configuration of the guide pin assembly.

One or more bushings 84 may be received in the bore 60 of the brake caliper 22. A bushing 84 may extend around and may receive the sleeve 82. A bushing 84 may be spaced apart from the sleeve 82. In FIGS. 5 and 6, a pair of bushings 84 are illustrated; however, it is contemplated that a greater or lesser number of bushings 84 may be provided. For instance, a single bushing 84 may be provided or more than two bushings 84 may be provided. For convenience in reference, the bushing 84 that is located furthest to the left from the perspective shown may be referred to as an outboard bushing while the bushing 84 that is located furthest to the right from the perspective shown may be referred to as an inboard bushing. In at least one configuration, the bushings 84 may be spaced apart from each other.

Referring primarily to FIGS. 4 and 5, a bushing 84 may have any suitable configuration. For instance, a bushing 84 may be configured as a hollow cylinder and may include a first end 120, a second end 122, an outer surface 124, and an inner surface 126. Optionally, bushing 84 may be provided with a slit 128 that may extend from the first end 120 to the second end 122. The slit 128 may split or separate the bushing 84 so that the bushing 84 may be expanded or contracted with respect to the axis 62 to accommodate manufacturing tolerances.

The first end 120 and the second end 122 may be spaced apart from each other and may be positioned at opposite ends of the bushing 84. The first end 120 may face toward the brake carrier 20. The second end 122 may face away from the brake carrier 20.

The outer surface 124 may face away from the axis 62 and may extend from the first end 120 to the second end 122. The outer surface 124 may engage or contact the bore surface 64 of the bore 60 in the caliper housing 50. The brake caliper 22 and more specifically the caliper housing 50 may be slidable along the outer surface 124.

The inner surface 126 may be disposed opposite the outer surface 124. As such, the inner surface 126 may face toward the axis 62, the sleeve 82, and a resilient member 86. The inner surface 126 may extend from the first end 120 to the second end 122. The inner surface 126 may be spaced apart from the sleeve 82 but may engage or contact a bushing 84.

A bushing 84 may or may not be partially received in the recess 102 of the sleeve 82.

In the configuration shown in FIG. 5, the bushings 84 are not received in the recess 102. In such a configuration, the inner surface 126 of the bushing 84 may have a larger diameter than the recess bottom surface 110, the grooves 104, or both. The inner surface 126 may have a larger diameter than the exterior surface 100 of the sleeve 82 or the same diameter as the exterior surface 100 of the sleeve 82.

In the configuration shown in FIG. 6, the bushings 84 extend into and are partially received in the recess 102. In such a configuration, the inner surface 126 of the bushing 84 may have a smaller diameter than the exterior surface 100 of the sleeve 82. Moreover, the inner surface 126 may have a larger diameter than the recess bottom surface 110, the grooves 104, or both. The first end 120, a second end 122, or both may be engageable with the sleeve 82 to limit or inhibit axial movement of a bushing 84. For instance, the first end 120 of a bushing 84 may be engageable with the first recess end surface 112 to inhibit axial movement of a bushing 84, such as the outboard bushing, to the left from the perspective shown. The second end 122 of a bushing 84 may face toward the second recess end surface 114 and may be engageable with the second recess end surface 114 to inhibit axial movement of a bushing 84, such as the inboard bushing, to the right from the perspective shown.

Referring to FIGS. 4-6, at least one resilient member 86 may be received in a bushing 84. A resilient member 86 may extend between the sleeve 82 and a bushing 84. For instance, a resilient member 86 may extend from the inner surface 126 of the bushing 84 to the sleeve 82. A resilient member 86 may be received in the recess 102 in the sleeve 82, a groove 104 in the sleeve 82, or both. It is also contemplated that a resilient member 86 may extend to the exterior surface 100. The resilient member 86 may have any suitable configuration. For instance, the resilient member 86 may extend continuously around the sleeve 82 and may be configured as an O-ring, a hollow tube or tubular structure, or the like. In the configuration shown, two resilient members 86 are provided inside each bushing 84; however, it is contemplated that a greater or lesser number of resilient members 86 may be provided. Resilient members 86 may be spaced apart from each other as shown or may be disposed adjacent to each other such that one resilient member 86 may engage or contact one or more other resilient members 86.

A resilient member 86 may be made of any suitable material. For instance, a resilient member 86 may be made of an elastomeric material like rubber or a polymer that may display rubber-like elasticity. As such, the resilient member 86 may absorb energy (e.g., store potential energy) when it is loaded and elastically deformed and may release energy when unloaded. A resilient member 86 may be compressed in a radial direction (e.g., along a radius that may extend perpendicular to the axis 62) when received inside a bushing 84. As such, the resilient member 86 may push or urge the bushing 84 away from the axis 62 and toward the bore surface 64.

The friction or "grip" between the resilient member 86 and the bushing 84 may be a function of the material properties of the resilient member 86, the material properties of the bushing 84, and the amount of compression of the resilient member 86. This friction or grip may also allow the resilient member 86 to be deformed when the brake caliper 22 moves axially with respect to the sleeve 82. For instance, the brake caliper 22 may be slidable along or parallel to the axis 62 in a first direction and in a second direction that may be disposed opposite the first direction. The first direction may extend to the right from the perspective shown in FIGS. 2, 3, 5 and 6. The second direction may extend to the left from the perspective shown.

Figure 3:
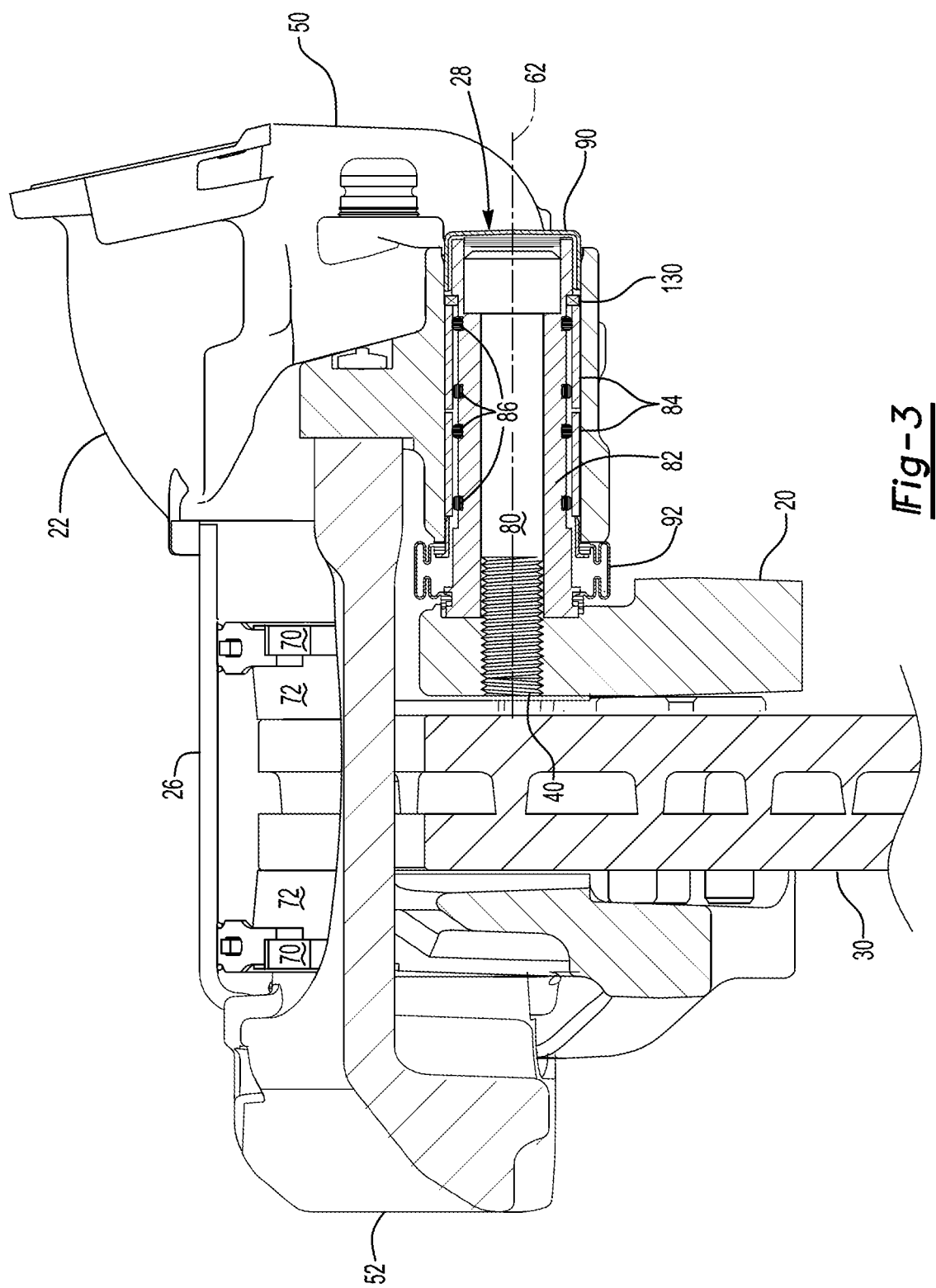
FIG. 3 is a section view that shows the brake assembly in a second position in which braking is applied.

The brake caliper 22 may move in the first direction with respect to the brake carrier 20 when braking or a braking force is applied. For example, the inboard brake pad assembly 24 may be moved from a retracted position in which the inboard brake pad assembly 24 may be spaced apart from the brake rotor 30 as shown in FIG. 2 into contact with the brake rotor 30 as shown in FIG. 3. Once the inboard brake pad assembly 24 contacts the brake rotor 30, a reaction force may then move the brake caliper 22 in the first direction with respect to the brake carrier 20 to actuate the outboard brake pad assembly 24 into engagement with the opposite side of the brake rotor 30 as shown in FIG. 3 to help slow rotation of the brake rotor 30 and an associated vehicle wheel. The bore surface 64 of the caliper housing 50 may slide along the outer surface 124 of the bushing 84 when the caliper housing 50 moves in the first direction. In addition, the resilient member 86 may distort (e.g., twist, rotate, bend, flex, etc.) in the first direction when the caliper housing 50 moves in the first direction, thereby storing potential energy in the resilient member 86 that may have an axial force vector component. Distortion of the resilient member 86 may allow the bushing 84 to move in the first direction when the caliper housing 50 moves in the first direction. As such, the bushing 84 may move with respect to the sleeve 82 when the brake caliper 22 slides along a bushing 84. The bushing 84 may move a shorter distance in the first direction than the caliper housing 50 moves in the first direction when braking is applied due to sliding of the caliper housing 50 along the bushing 84.

The brake caliper 22 may be slidable in the second direction under the biasing force exerted by the resilient member 86. Movement may occur in the second direction from the positioning shown in FIG. 3 back toward the positioning shown in FIG. 2 when braking force is subsequently released. For instance, retracting the inboard brake pad assembly 24 may disengage and separate the inboard brake pad assembly 24 from the brake rotor 30. The resilient member 86 may then be allowed to release its potential energy and bias or urge the brake caliper 22 to slide in the second direction (to the left from the perspective and positioning shown in FIG. 3 back to or toward the positioning shown in FIG. 2). The outboard brake pad assembly 24 may be movable away from the brake rotor 30 when the brake carrier 20 moves in the second direction. More specifically, sliding the brake caliper 22 in the second direction may increase the axial distance between the caliper bridge 52 and the brake rotor 30 and thus allow the outboard brake pad assembly 24 to retract, disengage and separate from the brake rotor 30. Retraction of the inboard brake pad assembly 24, the outboard brake pad assembly 24, or both may optionally be aided by one or more retraction springs, such as is disclosed in U.S. patent application Ser. No. 16/788,556, which is hereby incorporated by reference in its entirety. Release of potential energy from the resilient member 86 may allow the resilient member 86 or resilient members 86 to return or move with respect to the sleeve 82 back to or toward its/their previous undistorted condition before the brake caliper 22 was actuated in the first direction. Consequently, the bushing 84 may move in the second direction back toward its previous position when the caliper housing 50 moves in the second direction.

Optionally, a recoil resilient member 130 may be provided to bias the brake caliper 22 in the second direction. The recoil resilient member 130 may be disposed in the bore 60. In at least one configuration, the recoil resilient member 130 may be spaced apart from the bore surface 64 and may not be received in the bushing 84. The recoil resilient member 130 may be made of any suitable material that may display rubber-like elasticity as previously discussed with respect to the resilient member 86 and may configured as an O-ring, hollow tube or tubular structure, localized block, or the like. As such, the recoil resilient member 130 may absorb energy (e.g., store potential energy) when it is loaded and elastically deformed and may release energy when unloaded. The recoil resilient member 130 may be disposed near the second end 122 of a bushing 84. For instance, the recoil resilient member 130 may be disposed against the second recess end surface 114, may be disposed in a groove in the sleeve 82, or combinations thereof. The recoil resilient member 130 may be positioned to engage or contact the second end 122 of a bushing 84 when braking is applied and the brake caliper 22 is moved in the first direction, such as to the position shown in FIG. 3. The recoil resilient member 130 may be compressed in an axial direction (e.g., along or parallel to the axis 62) by the bushing 84 when the brake caliper 22 moves to the position in FIG. 3. Movement in the second direction from the positioning shown in FIG. 3 back toward the positioning shown in FIG. 2 when braking force is subsequently released may be aided by the recoil resilient member 130. For instance, retracting the inboard brake pad assembly 24 may disengage and separate the inboard brake pad assembly 24 from the brake rotor 30 and the recoil resilient member 130 may then be allowed to release its potential energy and bias or urge the brake caliper 22 to slide in the second direction and back to or toward the positioning shown in FIG. 2.

The bushing 84 may or may not slip with respect to the resilient member 86 when the brake caliper 22 slides in the first direction, the second direction, or both. For instance, the coefficient of friction between a resilient member 86 and the inner surface 126 of the bushing 84 may be greater than the coefficient of friction between the outer surface 124 of the bushing 84 and the bore surface 64. The bushing 84 may slip in an axial direction with respect to the resilient member 86 if the applied force overcomes the static friction force between a resilient member 86 and the inner surface 126.

A brake assembly having a slide pin assembly as described above may allow the brake caliper to slide along the outer surface of the bushing rather than having the brake caliper and bushing slide together such that the inner surface of the bushing slides along the sleeve. As such, the bushing may not be fixed to the brake caliper or assembled to the brake caliper with an interference fit. Such a configuration may allow the bushing to be more easily removed and replaced when worn. Moreover, such a configuration may allow the bushing to be loaded against the bore surface of the caliper housing, such as under a radial biasing force exerted by a resilient member, to help reduce clearance between the bore surface and the bushing and maintain contact with the bore surface as the outer surface of the bushing is worn. Accordingly, the resilient member and bushing may cooperate to compensate for bushing wear. In addition, the resilient member may help actuate the brake caliper when braking is released, thereby providing space for the outboard brake pad assembly to retract and disengage the brake rotor. As such, the brake assembly may facilitate disengagement of the outboard brake pad assembly from the brake rotor, which may help prevent the outboard brake pad assembly from dragging against a rotating brake rotor when braking is not applied. This in turn may reduce or eliminate unintended wear of the friction material of the outboard brake pad assembly, may help reduce friction and brake assembly temperatures, and may help improve fuel economy of the vehicle.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A brake assembly comprising:
a brake carrier;
a brake caliper that defines a bore that extends along an axis; and
a guide pin assembly that slidably couples the brake caliper to the brake carrier, the guide pin assembly including:
a bushing that is received in the bore;
a sleeve that is received in the bushing;
a resilient member that is received in the bushing and that extends between the bushing and the sleeve; and
a fastener that fixedly couples the sleeve to the brake carrier;
wherein the brake caliper is slidable along the bushing and the bushing is spaced apart from and does not contact the sleeve.

2. The brake assembly of claim 1 wherein the brake caliper is slidable in a first direction with respect to the brake carrier when a braking force is applied and the resilient member urges the brake caliper to slide in a second direction that is opposite the first direction when the braking force is subsequently released.

3. The brake assembly of claim 2 wherein a recoil resilient member is disposed on the sleeve and urges the brake caliper to move in the second direction.

4. The brake assembly of claim 2 wherein the brake caliper includes a caliper housing and a caliper bridge that extends from the caliper housing, the brake carrier receives an inboard brake pad and an outboard brake pad, and the outboard brake pad is moveable away from a brake rotor when the brake carrier moves in the second direction.

5. The brake assembly of claim 1 wherein the bushing contacts and does not move with respect to the brake caliper.

6. The brake assembly of claim 1 wherein the resilient member extends from the sleeve to the bushing.

7. The brake assembly of claim 1 wherein the sleeve has an exterior surface that faces away from the axis and a recess that extends toward the axis from the exterior surface, wherein the recess has a smaller diameter than the exterior surface.

8. The brake assembly of claim 7 wherein a groove is provided in the recess and receives the resilient member.

9. The brake assembly of claim 8 wherein the recess has a recess bottom surface, the groove extends from the recess bottom surface, and the groove has a smaller diameter than the recess bottom surface.

10. The brake assembly of claim 7 wherein the bushing is partially received in the recess.

11. The brake assembly of claim 7 wherein the bushing is not received in the recess.

12. The brake assembly of claim 7 wherein a recoil resilient member is disposed in the recess and is engageable with an end of the bushing.

13. A brake assembly comprising:
a brake caliper that has a caliper housing that defines a bore that extends along an axis;
a brake carrier that receives an inboard brake pad assembly that is positioned between the caliper housing and a brake rotor and that receives an outboard brake pad assembly that is positioned on an opposite side of the brake rotor from the inboard brake pad assembly; and
a guide pin assembly that slidably couples the brake caliper to the brake carrier, the guide pin assembly including:
a first bushing and a second bushing that are received in the bore and that engage the brake caliper;
a sleeve that is received in the first bushing and the second bushing;
first and second resilient members that engage the sleeve and that engage and are received in the first bushing and the second bushing, respectively; and
a fastener that is received in the sleeve and that fixedly couples the sleeve to the brake carrier;
wherein potential energy is stored in the first and second resilient members when the brake caliper slides along the first bushing and the second bushing in a first direction and potential energy is released from the first and second resilient members to urge the brake caliper to slide along the first bushing and the second bushing in a second direction that is disposed opposite the first direction.

14. The brake assembly of claim 13 wherein the first bushing and the second bushing move with respect to the sleeve when the brake caliper slides along the first bushing and the second bushing.

15. The brake assembly of claim 13 wherein the first and second resilient members are distorted in the first direction when the brake caliper slides in the first direction.

16. The brake assembly of claim 15 wherein the first and second resilient members return to their previous undistorted condition when the brake caliper slides in the second direction.

17. The brake assembly of claim 13 wherein the first bushing and the second bushing slip with respect to the first and second resilient members, respectively, when the brake caliper slides in the first direction.

18. The brake assembly of claim 13 wherein a pair of first resilient members are received in the first bushing and are spaced apart from each other.

19. The brake assembly of claim 13 wherein the first bushing and the second bushing are partially received in a recess in the sleeve, the recess being defined by a recess bottom surface, a first recess end surface that extends away from the axis from a first end of the recess bottom surface, and a second recess end surface that extends away from the axis from a second end of the recess bottom surface that is disposed opposite the first end, wherein an end of the first bushing is engageable with the first recess end surface and an end of the second bushing is engageable with the second recess end surface to limit axial movement of the first bushing and the second bushing, respectively.

20. The brake assembly of claim 13 wherein the inboard brake pad assembly exerts force against the brake rotor to slide the brake caliper in the first direction and move the outboard brake pad assembly into engagement with the brake rotor, and the outboard brake pad assembly is disengageable from the brake rotor when the inboard brake pad assembly does not exert force against the brake rotor and the brake caliper slides in the second direction under urging of the first and second resilient members.

* * * * *